United States Patent
Takizawa et al.

(10) Patent No.: US 8,451,443 B2
(45) Date of Patent: May 28, 2013

(54) DIFFRACTION OPTICAL ELEMENT, SPECTRAL COLORIMETRIC APPARATUS, AND IMAGE FORMING APPARATUS

(75) Inventors: Tokuji Takizawa, Utsunomiya (JP); Kazumi Kimura, Toda (JP)

(73) Assignee: Canon Kabushiki Kaisha (JP)

( * ) Notice: Subject to any disclaimer, the term of this patent is extended or adjusted under 35 U.S.C. 154(b) by 330 days.

(21) Appl. No.: 12/822,668

(22) Filed: Jun. 24, 2010

(65) Prior Publication Data

US 2011/0026022 A1  Feb. 3, 2011

(30) Foreign Application Priority Data

Jul. 29, 2009  (JP) ................. 2009-176446

(51) Int. Cl.
G01J 3/28 (2006.01)
G02B 5/18 (2006.01)
G02B 27/44 (2006.01)

(52) U.S. Cl.
USPC ............... 356/328; 359/566; 356/326

(58) Field of Classification Search
USPC .......... 356/326, 328, 330, 336, 236; 359/558, 359/563, 566
See application file for complete search history.

(56) References Cited

U.S. PATENT DOCUMENTS 5,228,103 A * 7/1993 Chen et al. ............. 385/14
6,097,863 A * 8/2000 Chowdhury ............ 385/37
6,606,156 B1  8/2003 Ehbets et al.
6,657,723 B2 * 12/2003 Cohen et al. ............. 356/328
8,184,289 B2 * 5/2012 Kimura et al. ............ 356/326
2010/0277730 A1 * 11/2010 Kimura et al. ............ 356/328
2010/0277731 A1 * 11/2010 Teramura et al. ........ 356/328
2010/0284084 A1 * 11/2010 Ishibe ...................... 359/571

FOREIGN PATENT DOCUMENTS

JP  9-160343 A  6/1997
JP  2000-298066 A  10/2000

* cited by examiner

*Primary Examiner* — Layla Lauchman
*Assistant Examiner* — Hina F Ayub
(74) *Attorney, Agent, or Firm* — Rossi, Kimms & McDowell LLP

(57) ABSTRACT

A concave reflection type diffraction optical element used for a Rowland type spectrometer, in which: the Rowland type spectrometer detects wavelengths in a range including a wavelength $\lambda_1$ or more and a wavelength $\lambda_2$ or less ($\lambda_1 < \lambda_2$); the concave reflection type diffraction optical element has a diffractive efficiency $D(\lambda)$ at a wavelength $\lambda$ which shows local maximum and maximum value at a wavelength $\lambda_a$ satisfying, $$\lambda_1 \leq \lambda_a < \frac{7\lambda_1 + 3\lambda_2}{10};$$

the concave reflection type diffraction optical element includes a reference surface having an anamorphic shape; and the following condition is satisfied: R>r, where R indicates a meridional line curvature radius of the reference surface and r indicates a sagittal line curvature radius thereof.

11 Claims, 10 Drawing Sheets

REFLECTION +1st-ORDER DIFFRACTED LIGHT
(AVERAGE OF P- AND S- POLARIZED LIGHT)

REFLECTION + 1st-ORDER DIFFRACTED LIGHT
(AVERAGE OF P- AND S- POLARIZED LIGHT)

REFLECTION + 2nd-ORDER DIFFRACTED LIGHT
(AVERAGE OF P- AND S- POLARIZED LIGHT)

DIFFRACTION OPTICAL ELEMENT, SPECTRAL COLORIMETRIC APPARATUS, AND IMAGE FORMING APPARATUS

BACKGROUND OF THE INVENTION

1. Field of the Invention

The present invention relates to a color sensor using a diffraction grating for color recognition or colorimetry on a subject to be tested, in particular, a color sensor which is suitable for performing colorimetry on toner or printing media in an image forming apparatus.

The present invention may be applied not only to the image forming apparatus but also to a spectral colorimetric apparatus such as a white balance sensor for a digital camera, and other colorimetric apparatus.

2. Description of the Related Art

In an image forming apparatus for forming a color image through an electrophotographic process, a deviation in color tone may occur because of color mixture of toner. The same problem occurs, not only in the electrophotographic type image forming apparatus but also in a general image forming apparatus for forming a color image such as an ink-jet type image forming apparatus.

For example, Japanese Patent Application Laid-Open No. H09-160343 proposes a method of measuring a spectral reflection light amount of a toner image using two different spectral filters and correcting an image signal based on the result of the measurement.

Further, in order to determine the color tone at higher precision, it is necessary to increase the number of spectral wavelength bands to at least three, which corresponds to the number of primary colors. When the number of wavelength bands may be further increased, the color tone may be determined at higher precision.

In order to increase the number of wavelength bands, there have been proposed a large number of diffraction spectrometers for performing spectral measurement, for example, in Japanese Patent Application Laid-Open No. 2000-298066.

When the diffraction spectrometer is used, there have been problems that still remain to be solved.

Up to now, a Rowland type diffraction spectrometer has been generally used. In the Rowland type diffraction spectrometer, dispersed light from a subject to be tested, which is illuminated by an illumination optical system, is incident on an incident slit. A light beam entering the incident slit is spectrally separated by a concave reflection type diffraction optical element and then obtained as a spectral intensity distribution by a one-dimensional array detector.

In a visible light region, an Si photo diode array is generally used as the one-dimensional array detector. A detector using the Si photo diode array has a maximum sensitivity in a near-infrared region but the sensitivity reduces as a wavelength shortens. Therefore, for example, there is a problem that a several-time detection sensitivity difference between a short-wavelength side and a long-wavelength side occurs in the visible light region.

In order to downsize the diffraction spectrometer, it is also necessary to reduce a size of an illumination light source. A halogen lamp or a xenon lamp, which has conventionally been used, has a problem in terms of necessary space and a problem of heat generation. In recent years, a high-intensity white LED of a type in which a fluorescence body is excited by an ultraviolet LED to obtain white light is used as an alternative to a light source including the halogen lamp or the xenon lamp. Even in an ultraviolet-excitation type white LED of which a color rendering property is said to be high, a spectral intensity in the short-wavelength region is significantly lower than a spectral intensity at the center wavelength, and hence the insufficient sensitivity of the one-dimensional array detector cannot be compensated. In order to effectively illuminate the subject to be tested, with a uniform amount of light based on light from the white LED which is a light source, a light guide is required. In order to reduce a size of the light guide, a transmission type element having a total-reflective surface and a refractive surface is desired. The element has a complicated shape and thus is desirably manufactured by plastic injection molding. However, a plastic material (polymethylmethacrylate (PMMA) or polycarbonate) generally has a low transmittance in the short-wavelength region, and hence the insufficient sensitivity of the one-dimensional array detector cannot be compensated.

Meanwhile, when spectral separation is performed using a diffraction grating, for example, first-order diffracted light is used. However, high-order undesirable diffracted light is actually generated. When a use wavelength band in the spectrometer is, for example, in a range of 350 nm to 750 nm, second-order diffracted light for a wavelength band of 350 nm to 375 nm overlaps with first-order diffracted light in a wavelength band of 700 nm to 750 nm on the detector, to thereby cause color mixture. Therefore, there is a problem that a difference occurs between the original chromaticity of the subject to be tested and detected chromaticity.

Up to now, for example, a method of cutting undesirable diffracted light using a high-order diffracted light cut filter has been employed for the problems. However, the high-order diffracted light cut filter is expensive, it is essential to reduce a size of the cut filter to be incorporated into an image forming apparatus, and there is another disadvantage in reducing the number of parts for needs to reduce an apparatus size.

SUMMARY OF THE INVENTION

An object of the present invention is to provide a spectral color sensor in which color mixture caused by high-order diffracted light having a short wavelength is reduced and high-precision spectral information is obtained over the entire evaluation wavelength band in view of optical efficiency of the entire optical system, to obtain small detection color difference relative to chromaticity of a subject to be tested.

In order to achieve the above-mentioned object, the present invention provides a concave reflection type diffraction optical element used for a Rowland type spectrometer, in which: the Rowland type spectrometer detects wavelengths in a range including a wavelength $\lambda_1$ or more and a wavelength $\lambda_2$ or less ($\lambda_1 < \lambda_2$); the concave reflection type diffraction optical element has a diffractive efficiency $D(\lambda)$ at a wavelength $\lambda$, local maximum and maximum value at a wavelength $\lambda_a$ satisfying, $$\lambda_1 \leq \lambda_a < \frac{7\lambda_1 + 3\lambda_2}{10};$$

the concave reflection type diffraction optical element includes a reference surface having an anamorphic shape; and the following condition is satisfied: $R > r$, where $R$ indicates a meridional line curvature radius of the reference surface and $r$ indicates a sagittal line curvature radius thereof.

According to the present invention, diffractive efficiency on a short-wavelength side in the evaluation wavelength band of the spectrometer is set to a high value, and hence the generation of second-order diffracted light at a short wavelength may be suppressed to effectively reduce color mixture with first-order diffracted light on a long-wavelength side. Therefore, it is unnecessary to use a high-order diffracted light cut filter, and hence a reduction in cost may be achieved.

The diffractive efficiency of the first-order diffracted light in the short-wavelength range is improved, and hence a reduction in detection dynamic range at a short wavelength, which is caused by a spectral sensitivity characteristic of a photoelectric conversion element and a spectral transmission characteristic of an illumination optical system, may be compensated. Therefore, higher-precision spectral measurement may be achieved.

As a result, the meridional line curvature radius "R" (spectral direction) and the sagittal line curvature radius "r" (non-spectral direction) in the concave reflection type diffraction optical element are set to satisfy the relationship of R>r, and hence a sensor acquisition light amount on the long-wavelength side may be increased to compensate a light amount reduced in the long-wavelength range.

Further features of the present invention become apparent from the following description of exemplary embodiments with reference to the attached drawings.

DESCRIPTION OF THE EMBODIMENTS

Hereinafter, exemplary embodiments of the present invention are described in detail with reference to the attached drawings.

Embodiment 1

In this embodiment, an example of a spectral color sensor using a spectral reflection type diffraction optical element according to the present invention is described.

Figure 1:
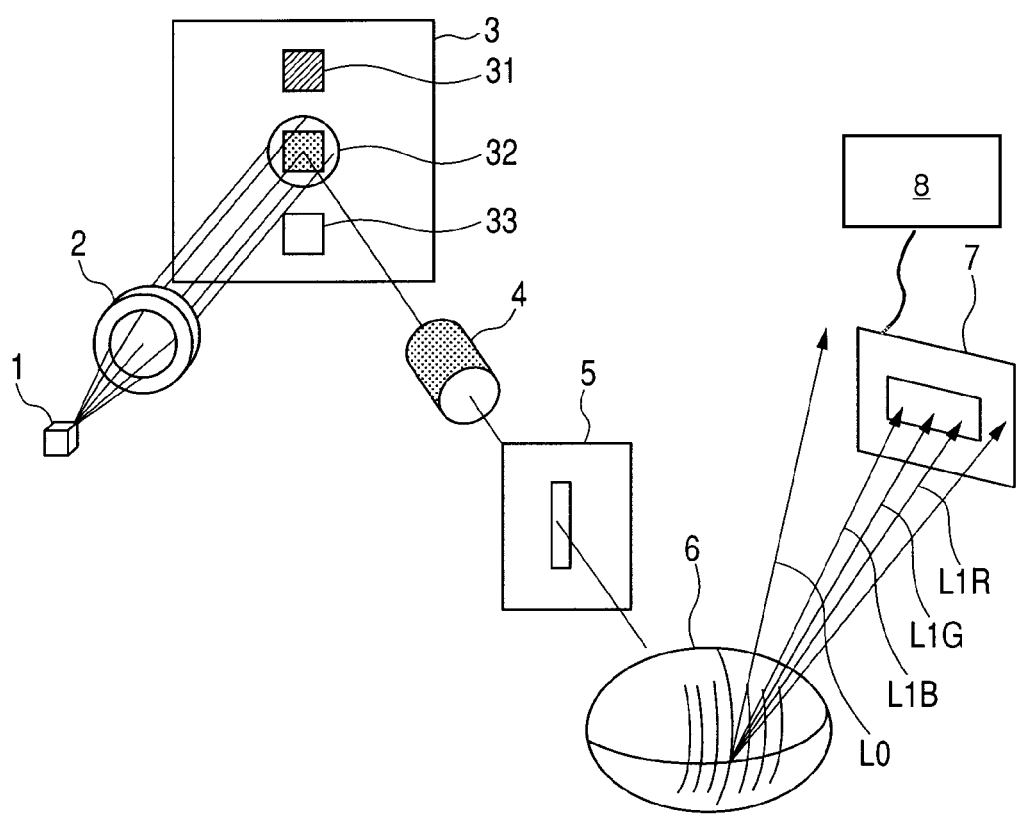
FIG. 1 is a perspective view illustrating a spectral color sensor according to Embodiment 1 of the present invention.
Figure 2:
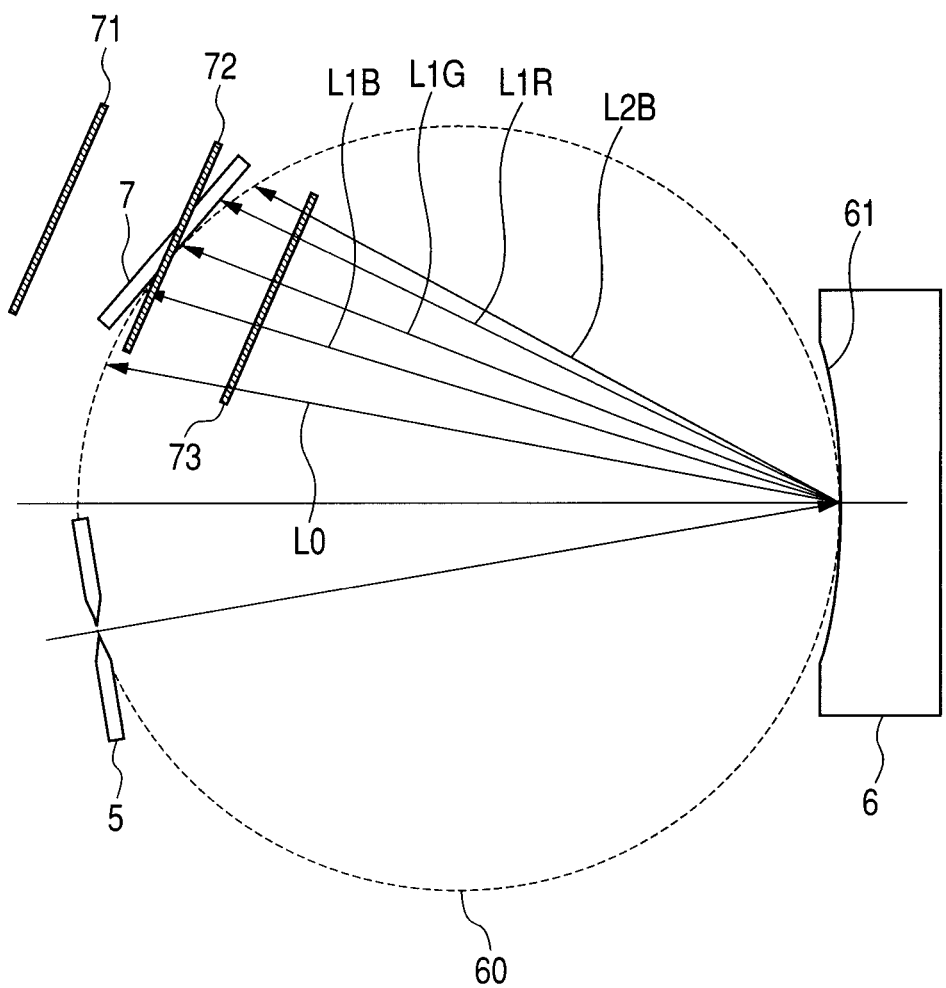
FIG. 2 is a principal cross sectional view illustrating the spectral color sensor according to Embodiment 1 of the present invention.
Figure 3:
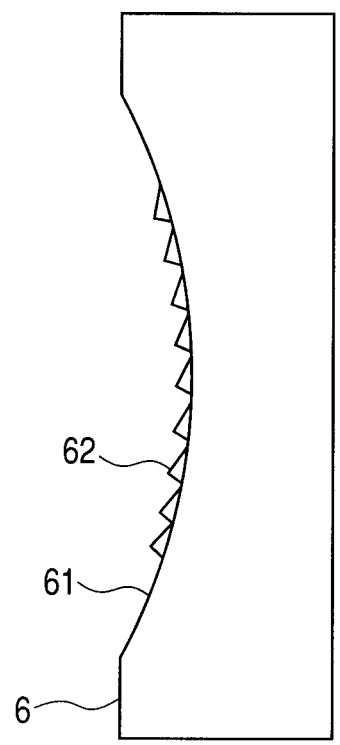
FIG. 3 is a principal cross sectional view illustrating a reflection type spectral element according to Embodiment 1 of the present invention.

FIG. 1 is a perspective view illustrating the spectral color sensor using the diffraction optical element according to Embodiment 1 of the present invention. FIG. 2 is a principal cross sectional view illustrating the spectral color sensor. FIG. 3 is a cross sectional view illustrating the diffraction optical element.

The spectral color sensor of this embodiment has a Rowland type spectrometer structure, which is simple and effective for a reduction in size. When an incident slit 5 and a concave reflection type diffraction optical element 6 are provided on a Rowland circle 60, diffracted light is imaged onto a position on the Rowland circle depending on a wavelength. A one-dimensional array detector 7 is provided on the position, to thereby obtain a spectral intensity distribution at the same time.

As illustrated in FIG. 3, the concave reflection type diffraction optical element 6 includes a large number of fine blaze diffraction gratings 62 provided on a curved base surface 61. In FIG. 3, the blaze diffraction gratings are illustrated with not a full size but an exaggerated size.

A subject to be tested 3 is illuminated by an illumination apparatus (illumination optical system) including a light source 1 and a condensing element 2, and reflected light therefrom is guided to a spectral measurement unit which is constituted by the concave reflection type diffraction optical element 6 and the one-dimensional array detector 7, through a light guide 4 and the incident slit 5. A light beam guided to the spectral measurement unit through the incident slit 5 is spectrally separated and condensed by the concave reflection type diffraction optical element 6, and then imaged for each wavelength on the one-dimensional array detector 7 to form a slit image.

The one-dimensional array detector 7 converts a light amount for each wavelength into an electrical signal, and transmits the electrical signal to an analyzing apparatus (analysis unit) 8. The analyzing apparatus computes chromaticity of the subject to be tested 3 from an internal table based on the input spectral intensity information.

Desired color patches 31, 32, and 33 are printed on the subject to be tested 3 having a color tint to be determined. The illumination apparatus for illuminating the color patches includes the light source 1 and the condensing element 2. The color patches 31, 32, and 33 are sequentially moved and illuminated.

In this embodiment, a white light emitting diode (white LED) is used as the light source 1.

The white LED is generally divided into the following three types. That is, the types are (1) a combination of red, blue, and green LEDs for light emission, (2) a combination of a blue LED and a yellow fluorescence body, and (3) a combination of an ultraviolet-excitation LED and RGB fluorescence bodies. The type (1) has a structure in which light beams are simultaneously emitted from the red, blue, and green LEDs which are sealed in the same package, to obtain white light. However, spectrums of the three color LEDs are fundamentally superimposed, and hence the type (1) is not suitable as a light source for colorimetry. The type (2) is a most general method for a white LED structure. Yellow light of approximately 570 nm which is emerged from the fluorescence body is mixed light of red and green. When the mixed light is mixed with blue light of approximately 470 nm which is emitted from the blue LED, white light may be generated. However, a short-wavelength side range depends on a spectrum of the LED. Therefore, no spectrum is present in a range smaller than 470 nm, and hence the short-wavelength side range is narrow. In the type (3), white light is generated based on three light beams, red light of approximately 630 nm, green light of approximately 530 nm, and blue light of approximately 460 nm, which are required for original white light, and hence a wide-band spectrum is obtained. Therefore, the type (3) is most suitable as an illumination light source for a colorimetric optical system.

Figure 4:
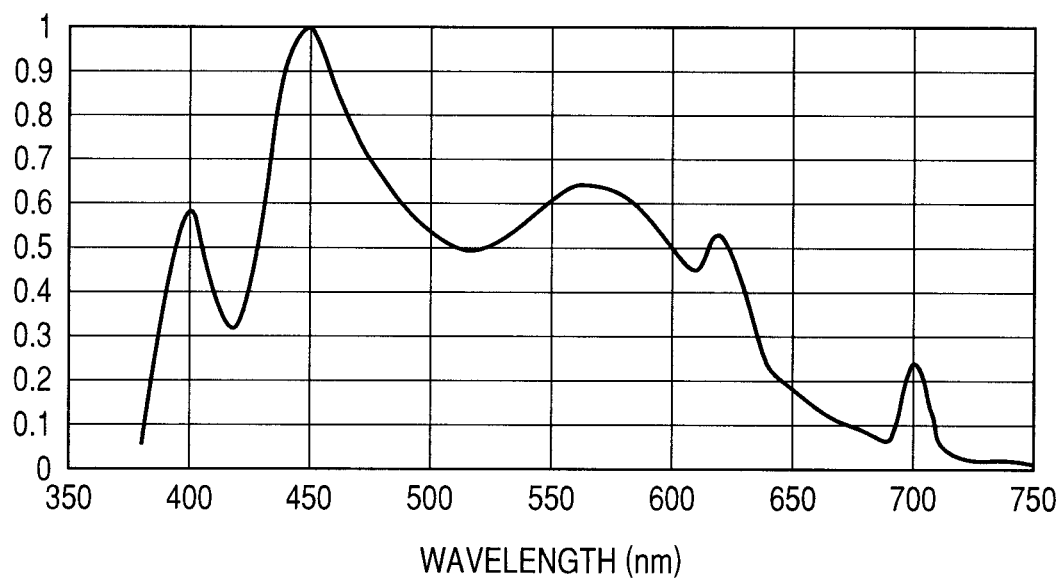
FIG. 4 is an explanatory diagram illustrating a light emission spectrum of a general ultraviolet-excitation type white LED.

In view of the circumstances described above, in this embodiment, an ultraviolet LED excitation type white LED is used as the illumination light source. FIG. 4 illustrates a spectral distribution of the ultraviolet LED excitation type white LED. An LED generally has a predetermined orientation characteristic intrinsic in an element structure thereof. Therefore, the condensing element 2 is employed to improve illumination efficiency, to thereby uniformly illuminate the subject to be tested and reduce a fluctuation in light amount due to the rising of the subject to be tested.

The condensing element 2 is a plastic lens and manufactured by injection molding.

The light guide 4 guides, to the slit 5, reflected light from the subject to be tested. The light guide 4 is a condensing element which exhibits a condensing action in a direction parallel to a spectral direction and has an anamorphic power. The light guide 4 has a structure for forming a substantially linear image on the slit 5. As in the case of the condensing element 2, the light guide 4 is made of plastic material.

Figure 5:
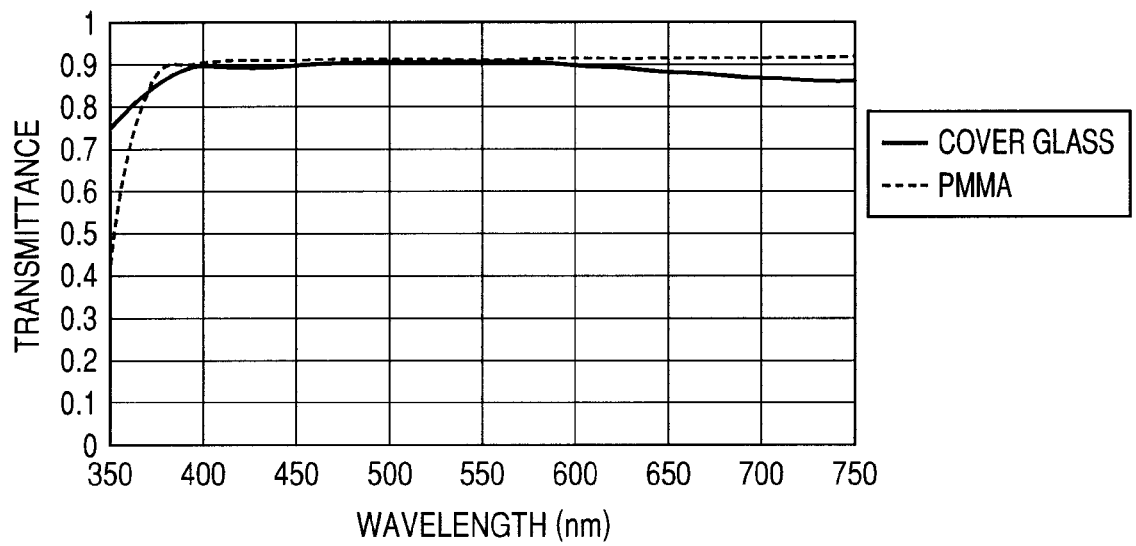
FIG. 5 is an explanatory diagram illustrating a spectral transmittance of a normal PMMA.

A plastic material to be used is desirably an existing optical resin material, for example, acrylic, polycarbonate, or a polyolefin resin. A transmittance of acrylic which is a typical resin material example is illustrated in FIG. 5 (solid line). In a visible range equal to or larger than 400 nm, the transmittance exceeds 90%. On the other hand, in an ultraviolet range smaller than 400 nm, the transmittance reduces. In FIG. 5, a spectral transmittance of a cover glass material, for example, soda lime glass is indicated by a broken line. In order to increase dust resistance, the cover glass (not shown in FIG. 1) may be provided between the condensing element 2 and the subject to be tested 3 or between the subject to be tested 3 and the light guide 4. In this case, as illustrated in FIG. 5, the transmittance exceeds 90% in the visible range equal to or larger than 400 nm, but the transmittance reduces in the ultraviolet range smaller than 400 nm.

A measurement light beam passing through the incident slit 5 is spectrally separated and condensed by the concave reflection type diffraction optical element 6, and then imaged for each wavelength on the one-dimensional array detector 7 to form the slit image. Spectrally separated first-order diffracted light beams L1B, L1G, and L1R and a zero-order diffracted light beam (reflected light) L0 are illustrated in FIGS. 1 and 2.

Figure 6:
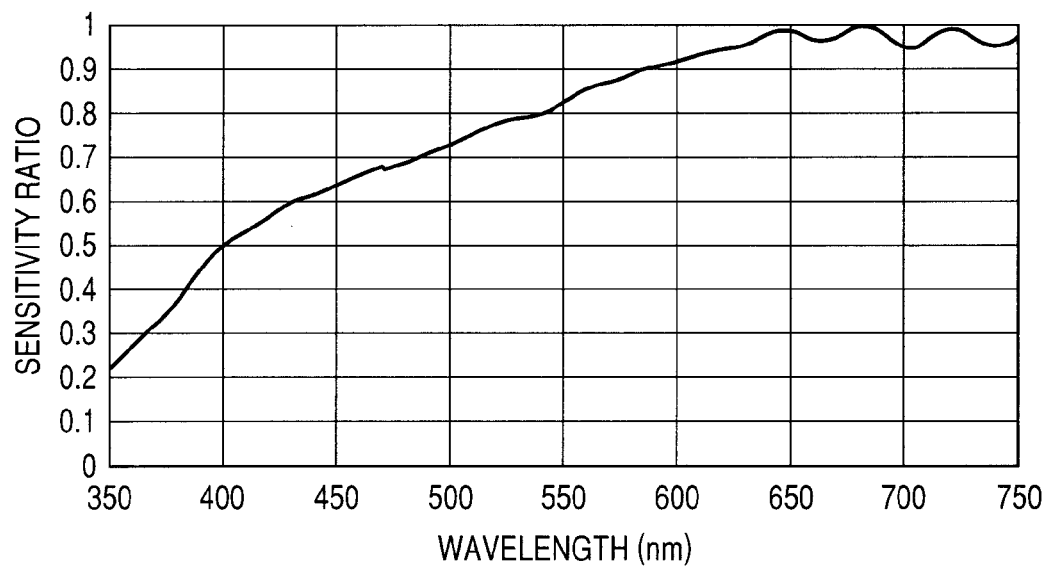
FIG. 6 is an explanatory diagram illustrating spectral sensitivity of an Si photo diode.

An Si photo diode array is generally used as the one-dimensional array detector 7. In view of the structure of the Si photo diode array, a spectral sensitivity characteristic in a region close to a near-infrared region is high and the spectral sensitivity significantly reduces as the wavelength shortens. FIG. 6 illustrates a spectral sensitivity characteristic of an Si photo diode (light receiving element). For example, when a use wavelength band is set to a range of 350 nm to 750 nm, as is apparent from the spectral sensitivity characteristic illustrated in FIG. 6, spectral sensitivity at 350 nm is equal to or smaller than a half of spectral sensitivity at 750 nm. Therefore, dynamic ranges of output signals in the short-wavelength region and the long-wavelength region significantly differ from each other, and hence a reduction in resolution occurs in the short-wavelength region.

In addition, when the spectral characteristic of the light source 1 of the illumination apparatus which is illustrated in FIG. 4 and the spectral transmittance characteristic of the condensing element 2 or the light guide 4 which is illustrated in FIG. 5 are taken into account, a dynamic range difference between the short-wavelength region and the long-wavelength region increases.

Thus, in the present invention, the diffractive efficiency characteristic of the concave reflection type diffraction optical element 6 is controlled so that the diffractive efficiency in the short-wavelength region becomes higher than the diffractive efficiency in the long-wavelength region, to thereby compensate for the dynamic range difference.

Specifically, the diffraction optical element is provided so that diffractive efficiency $D(\lambda)$ of the diffraction optical element with respect to a wavelength $\lambda$ takes a local maximum value and a maximum value at a wavelength $\lambda_a$ satisfying the following expression in a wavelength range of $\lambda_1$ or more and $\lambda_2$ or less ($\lambda_1 < \lambda_2$), which is detected by the spectrometer.

$$\lambda_1 \leq \lambda_a < \frac{7\lambda_1 + 3\lambda_2}{10} \tag{1}$$

The diffraction optical element is desirably provided so that the diffractive efficiency takes a local maximum value and a maximum value at the wavelength $\lambda_a$ satisfying the following expression.

$$\lambda_1 \leq \lambda_a < \frac{4\lambda_1 + \lambda_2}{5} \tag{2}$$

Figure 7:
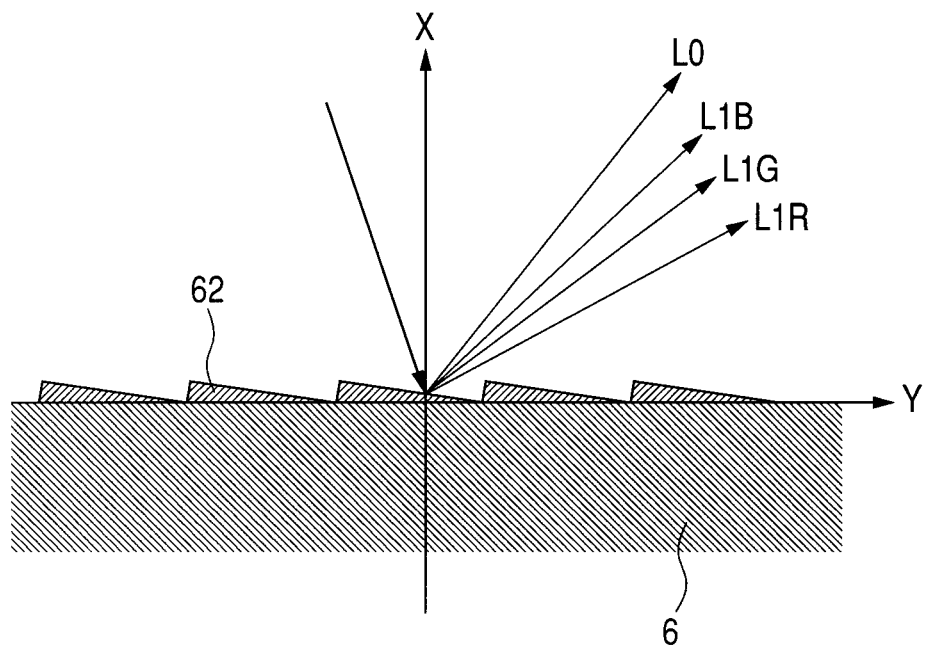
FIG. 7 is a principal cross sectional view in a meridional line direction, illustrating a diffraction optical element according to Embodiment 1 of the present invention.

As illustrated in FIG. 7, a direction of plane normal to a base surface in which a blaze diffraction grating is formed in the center position of the concave reflection type diffraction optical element 6 is defined as an X-axis, a spectral direction perpendicular to the X-axis is defined as a Y-axis, and an axis orthogonal to the X-axis and the Y-axis is defined as a Z-axis. The concave reflection type diffraction optical element 6 includes the blaze diffraction gratings provided on an anamorphic surface having different curvatures in the Y-direction and the Z-direction.

In the Rowland type spectrometer structure, the concave reflection type diffraction optical element generally has a base surface which is a spherical surface. Therefore, there is a problem that light is not condensed in the direction orthogonal to the spectral direction, to thereby reduce an intensity of light entering the one-dimensional array detector. Thus, the base surface is provided as the anamorphic surface of the concave reflection type diffraction optical element.

The concave reflection type diffraction optical element 6 is manufactured as follows. A plastic optical element is formed by injection molding, and a reflective film made of Al or the like and a high-reflection film made of $SiO_2$ or the like are formed on the plastic optical element by vapor deposition. The concave reflection type diffraction optical element may be manufactured by performing direct ion beam processing or existing lithography processing on an optical substrate such as a quartz substrate.

The concave reflection type diffraction optical element 6 is described in detail.

FIG. 3 is a cross sectional view (X-Y cross-section) illustrating the concave reflection type diffraction optical element 6 in the spectral direction.

Tables 1 and 2 illustrate various specifications of the spectrometer and the shape of the concave reflection type diffraction optical element 6 in this embodiment.

TABLE 1

(Spectrometer Specifications)

| | |
|---|---|
| Spectral range | 350 nm to 750 nm |
| Light source | Ultraviolet LD excitation type white LED |
| Incident slit width | 60 μm |
| Incident slit height | 2 mm |
| Detection element | Si photo diode array |
| Diffraction order m | 1 |
| Pixel pitch of light receiving element | 25 μm |
| size of light receiving element in non-spectral direction | 1 mm |
| Wavelength resolution | 3.3 nm |

TABLE 2

(Diffraction Optical Element Specifications)

| | |
|---|---|
| Base surface meridional line curvature radius (mm) | 12.5 |
| Base surface sagittal line curvature radius (mm) | 10.3 |
| Grating pitch P (μm) | 1.85 |
| Grating height h (μm) | 0.175, 0.200, 0.225 |
| Blaze angle θb (°) | 5.4, 6.2, 6.9 |
| Incident angle α (°) | 9 |
| Reflective film | Al-based multilayer film |

Blaze diffraction gratings of a diffraction optical element are generally single-layer diffraction gratings, and hence the diffractive efficiency takes maximum and local maximum values at a blaze wavelength and gradually reduces as the blaze wavelength cubic-functionally changes to the short-wavelength side and the long-wavelength side. Therefore, when the diffraction grating shape is set so that a wavelength close to a minimum wavelength in the detection wavelength band of the spectrometer is the blaze wavelength, the problem described above may be solved. However, such setting is not sufficient. The light amount level of the light source on the long-wavelength side is equal to or lower than the light amount level thereof on the short-wavelength side, and hence it is also necessary to ensure the light amount on the long-wavelength side. This point may be solved when the concave reflection type diffraction optical element is configured to have a shape (curvature radius) thereof in the cross section orthogonal to the spectral direction thereof so that an incident light amount of the one-dimensional array detector is maximum on the long-wavelength side.

In the present invention, the concave reflection type diffraction optical element having the anamorphic-shaped base surface satisfies $$R > r \quad (3)$$

where R indicates a meridional line curvature radius of the base surface and r indicates a sagittal line curvature radius thereof.

Expression (1) is a conditional expression set to exhibit that diffractive efficiency of a necessary order is maximized to minimize higher-order undesirable diffracted light in a case where the blaze wavelength is assumed to be the minimum wavelength ($\lambda_1$) in the detection wavelength range, and $D(\lambda_1) > D(\lambda_2)$ holds in a case where the blaze wavelength is smaller than an upper limit of Expression (1), to thereby define an allowable range against the higher-order undesirable diffracted light. In view of the undesirable diffracted light, it is more desirable to satisfy Expression (2).

In other words, the same is expected even when the grating height "h" of the diffraction gratings is alternatively set in place of the blaze wavelength.

In the present invention, when the grating height of the reflection type diffraction optical element is denoted by "h" and the diffraction order to be used is denoted by "m", the reflection type diffraction optical element is provided to satisfy the following expression in the wavelength range of $\lambda_1$ or more and $\lambda_2$ or less ($\lambda_1 < \lambda_2$), which is detected by the spectrometer.

$$\frac{\lambda_1}{2}m \leq h < \frac{7\lambda_1 + 3\lambda_2}{20}m \quad (4)$$

The reflection type diffraction optical element is desirably provided to satisfy the following expression.

$$\frac{\lambda_1}{2}m \leq h < \frac{4\lambda_1 + \lambda_2}{10}m \quad (5)$$

Expressions (4) and (5) are derived from the diffraction conditional expression for reflection to obtain the blaze wavelength in the wavelength ranges of Expressions (1) and (2).

Expression (3) defines a relationship between the meridional line curvature radius R and the sagittal line curvature radius r in a case where the imaging state of the slit image on the surface of the one-dimensional array detector 7 is excellent. The light amount on the long-wavelength side reduces as the wavelength at which the diffractive efficiency is maximum becomes shorter, and hence an SN ratio degrades. Therefore, it is necessary to make a design so that an imaging state in a non-spectral direction (that is, direction perpendicular to Rowland circle relative to spectral direction which is circumference direction of Rowland circle) on the long-wavelength side is excellent. When the condition of Expression (3) is not satisfied, the light amount on the long-wavelength side becomes lower than the light amount on the short-wavelength side, and hence the SN ratio of measurement degrades.

Figure 8A:
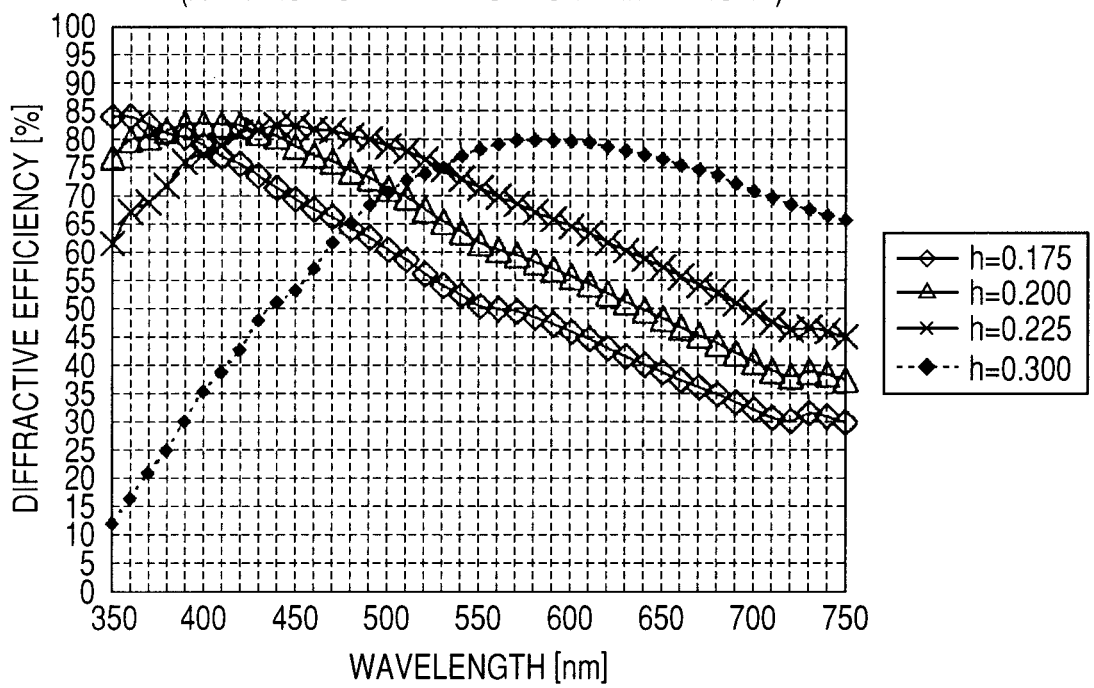
FIG. 8A is an explanatory diagram illustrating a relationship between diffractive efficiency of a diffraction order to be used and a wavelength in the diffraction optical element according to Embodiment 1 of the present invention.

FIG. 8A is a graph illustrating a relationship between the wavelength and the diffractive efficiency $D(\lambda)$ (=(design order light exit amount)/(incident light amount)) of the concave reflection type diffraction optical element according to this embodiment. The reflection characteristic of the reflective film is also taken into account because of the reflection type diffraction optical element, and the diffractive efficiency is calculated by rigorous coupled-wave analysis.

FIG. 8A illustrates diffractive efficiencies of first-order diffracted light which are calculated in four cases, that is, three embodiments in which the grating height "h" is 0.175 μm, 0.200 μm, and 0.225 μm and a comparative example of h=0.300 μm.

In this embodiment, $\lambda_1$=350 nm and $\lambda_2$=750 nm ($\lambda_2$>2$\lambda_1$ is satisfied).

As is apparent from the comparative example of h=0.300 μm, the diffractive efficiency significantly reduces on the short-wavelength side. In contrast, in the embodiments of h=0.175 μm, 0.200 μm, and 0.225 μm, the diffractive efficiency on the short-wavelength side is larger than the diffractive efficiency on the long-wavelength side. Therefore, an unbalance between the diffractive efficiency on the short-wavelength side and the diffractive efficiency on the long-wavelength side may be compensated based on the spectral sensitivity characteristic of the Si photo diode as illustrated in FIG. 6 and the spectral transmittance of the resin material as illustrated in FIG. 5.

Whether or not the conditions in this embodiment satisfy the conditions of Expressions (1) and (4) is verified. From $\lambda_1$=350 nm, $\lambda_2$=750 nm, and m=1, Expression (4) exhibits "175 nm≦h<235 nm", and hence h=0.175 μm, 0.200 μm, and 0.225 μm satisfy Expression (4). In addition, Expression (1) exhibits "350 nm≦λ<470 nm". As is apparent from FIG. 8A, in the embodiments of h=0.175 μm, 0.200 μm, and 0.225 μm, wavelengths at which the diffractive efficiency D(λ) takes maximum and local maximum values are 360 nm, 400 nm, and 450 nm, and hence Expression (1) is satisfied.

In order to compensate the spectral sensitivity characteristic of the Si photo diode which changes smoothly as illustrated in FIG. 6, it is desirable to satisfy Expression (2) or (5). From $\lambda_1$=350 nm, $\lambda_2$=750 nm, and m=1, Expression (5) exhibits "175 nm≦h<215 nm", and hence h=0.175 μm and 0.200 μm satisfy Expression (5). In addition, Expression (2) exhibits "350 nm≦λ<430 nm". As is apparent from FIG. 8A, in the embodiments of h=0.175 μm and 0.200 μm, wavelengths at which the diffractive efficiency D(λ) takes maximum and local maximum values are 360 nm and 400 nm, and hence Expression (2) is satisfied.

Figure 8B:
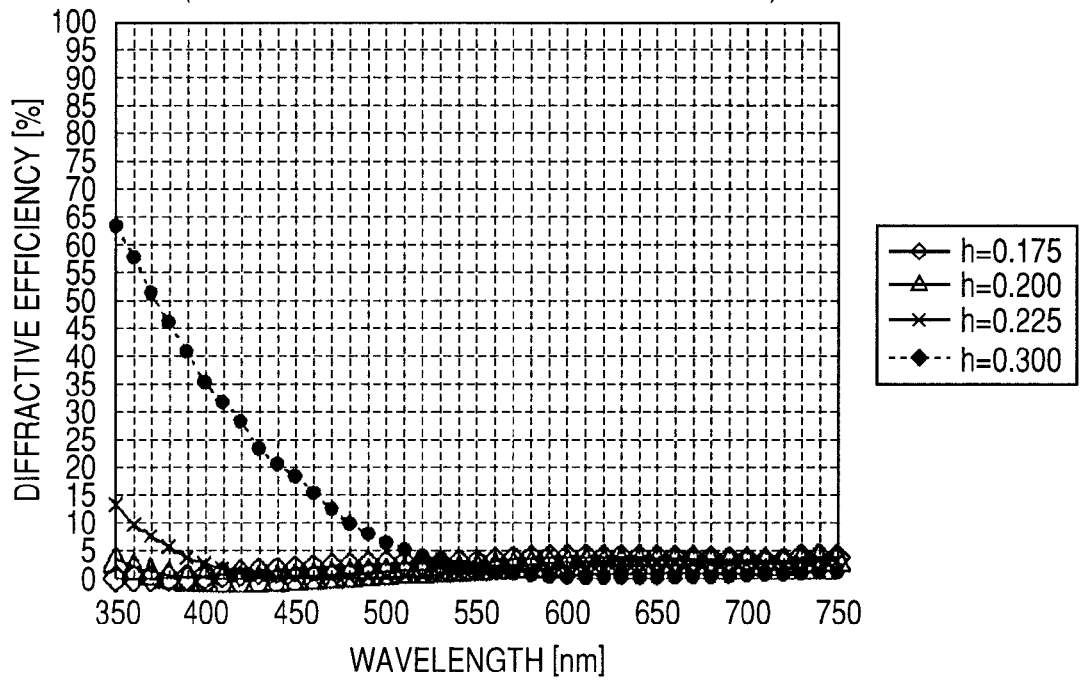
FIG. 8B is an explanatory diagram illustrating a relationship between diffractive efficiency of an adjacent diffraction order and a wavelength in the diffraction optical element according to Embodiment 1 of the present invention.

FIG. 8B illustrates diffractive efficiencies of second-order diffracted light in four cases, that is, three embodiments in which the grating height "h" is 0.175 μm, 0.200 μm, and 0.225 μm and a comparative example of h=0.300 μm. The second-order diffracted light is undesirable diffracted light and thus becomes a cause of ghosts. For example, second-order diffracted light of light having a wavelength of 350 nm is imaged in the same position as first-order diffracted light of light having a wavelength of 700 nm. Therefore, as shown in the comparative example of h=0.300 μm (FIG. 8B), the second-order diffracted light of a short wavelength (λ=350 nm) is mixed in color with the first-order diffracted light of a long wavelength (λ=700 nm), and hence sufficient optical performance for the first-order diffracted light cannot be obtained. In contrast to the comparative example, in the embodiments of h=0.175 μm, 0.200 μm, and 0.225 μm, the second-order diffracted light on the short-wavelength side is sufficiently reduced, and hence the spectral performance for the first-order diffracted light may be improved. As is apparent from FIG. 8B, in the embodiments of h=0.175 μm and 0.200 μm, the second-order diffracted light on the short-wavelength side is further reduced, and hence a large effect is obtained.

Figure 8C:
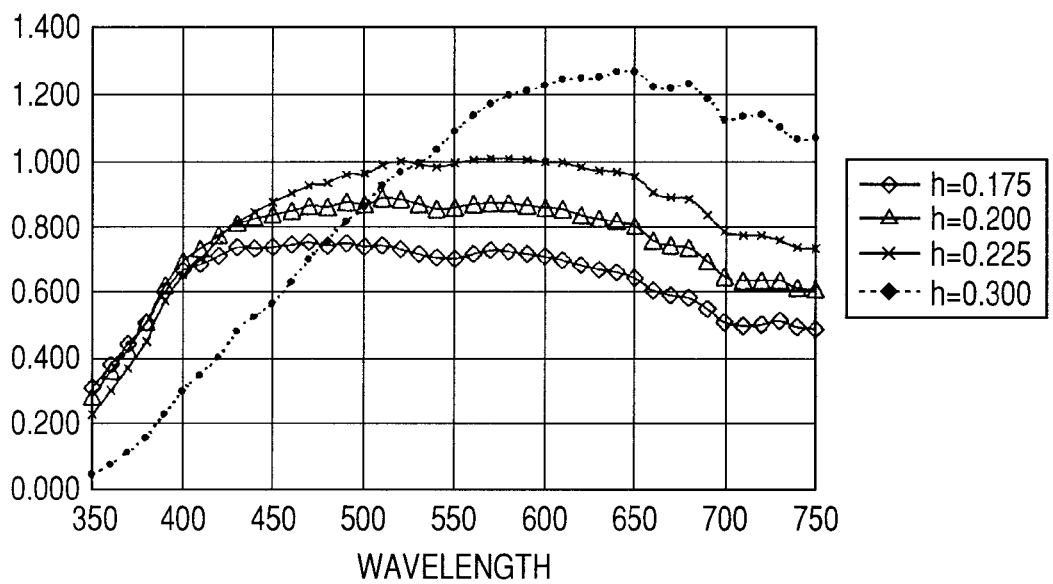
FIG. 8C is an explanatory diagram illustrating a relationship between the product of diffractive efficiency in the diffraction optical element and the spectral sensitivity of the Si photo diode, and a wavelength according to Embodiment 1 of the present invention.

FIG. 8C illustrates relationships between the wavelength and the products of the diffractive efficiencies D(λ) in the embodiments and the comparative example as illustrated in FIG. 8A and the spectral sensitivity characteristic of the Si photo diode as illustrated in FIG. 6. As is apparent from the comparative example of h=0.300 μm, the product of the diffractive efficiency and the spectral sensitivity significantly reduces on the short-wavelength side. In contrast to the comparative example of h=0.300 μm, as is apparent from the embodiments of h=0.175 μm, 0.200 μm, and 0.225 μm, the product of the diffractive efficiency and the spectral sensitivity is not significantly changed between the short-wavelength side and the long-wavelength side, and hence the wavelength dependence is excellently compensated.

In the optical system, an incident slit which is 60 μm in width and 2 mm in height is used. A one-dimensional array type light receiving element which has a pitch of 2.5 μm and a height of 1 mm is used. Therefore, an image of the incident slit is formed on the one-dimensional array type light receiving element at substantially the same magnification by the concave reflection type diffraction optical element, and hence the slit image is vignetted depending on a size of a sensor. Thus, the amount of light received by the sensor changes depending on the imaging state in the non-spectral direction (direction perpendicular to plane including Rowland circle).

Figure 10A:
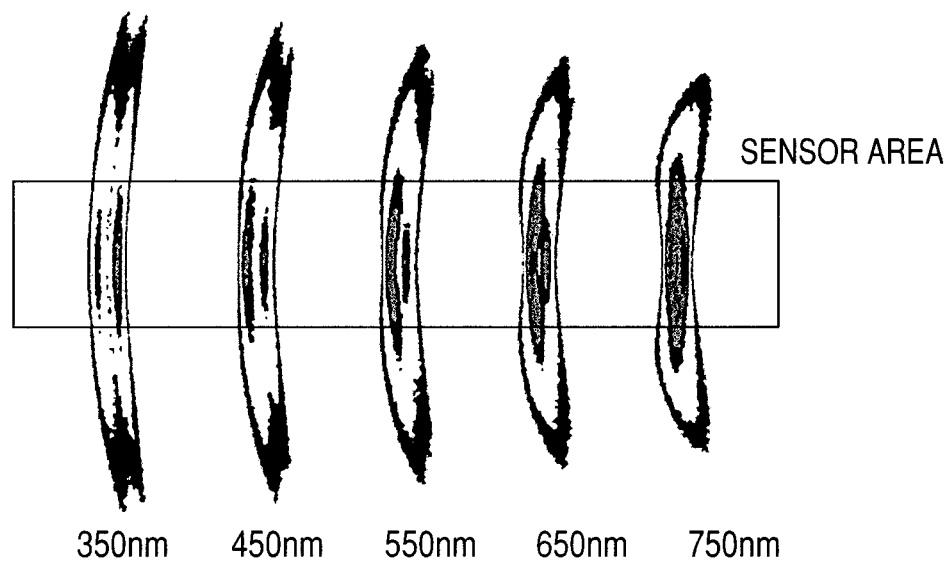
FIG. 10A illustrates slit images in Embodiment 1 of the present invention.

FIG. 10A illustrates a slit image profile on the surface of the one-dimensional light receiving element array (one-dimensional array detector) 7 in this embodiment.

Figure 10B:
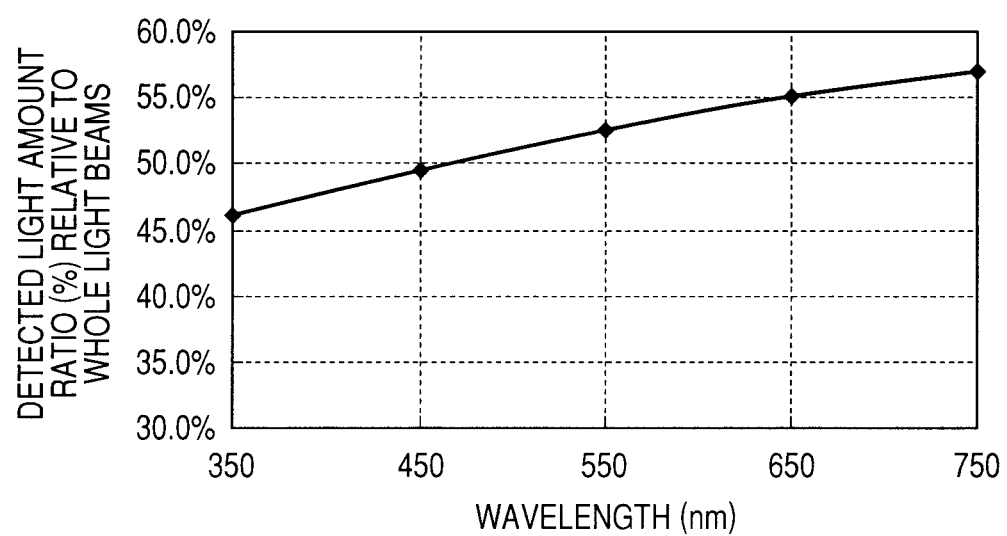
FIG. 10B illustrates a sensor detected light amount ratio relative to whole light beams.

As is apparent from FIG. 10A, when the wavelength is shifted from 750 nm to a shorter wavelength side, an expansion of the image in an upward and downward direction (non-spectral direction, that is, direction perpendicular to Rowland circle) becomes wider and thus blur becomes larger. A rectangle illustrated in FIG. 10A corresponds to an outer shape of the one-dimensional light receiving element array 7. FIG. 10B is a plot with respect to wavelength, illustrating ratios of the amounts of light beams entering the one-dimensional light receiving element array to the total light amounts of diffraction images of light beams entering the incident slit, which are produced at respective wavelengths by the diffraction optical element. As is apparent from FIG. 10B, a detected light amount ratio at a wavelength of 750 nm is higher than a detected light amount ratio at a wavelength of 350 nm by approximately 10.9 points. That is, it is apparent that the low diffractive efficiency on the long-wavelength side may be compensated by increasing a detectable light amount ratio of the one-dimensional light receiving element array.

Figure 11A:
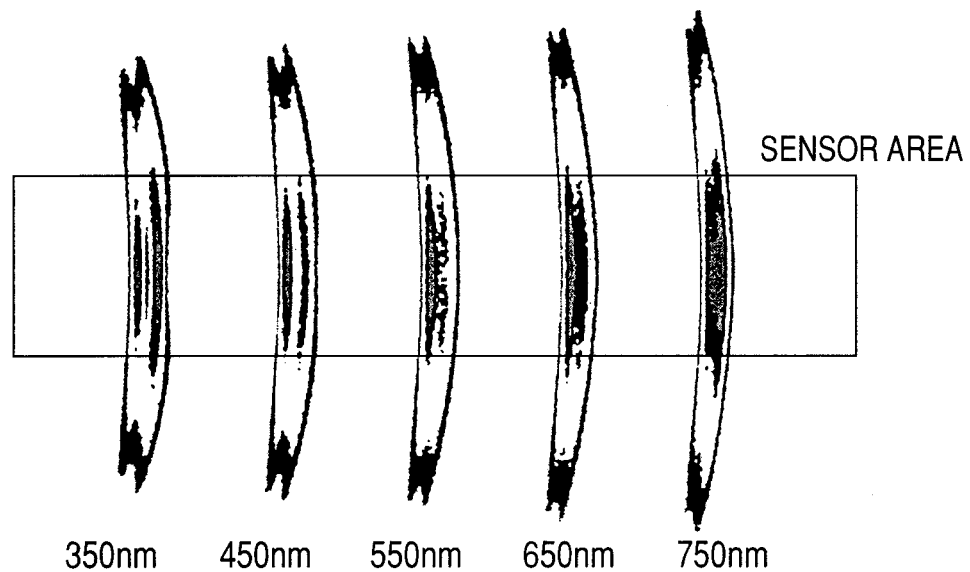
FIG. 11A illustrates slit images in a comparative example of the present invention.
Figure 11B:
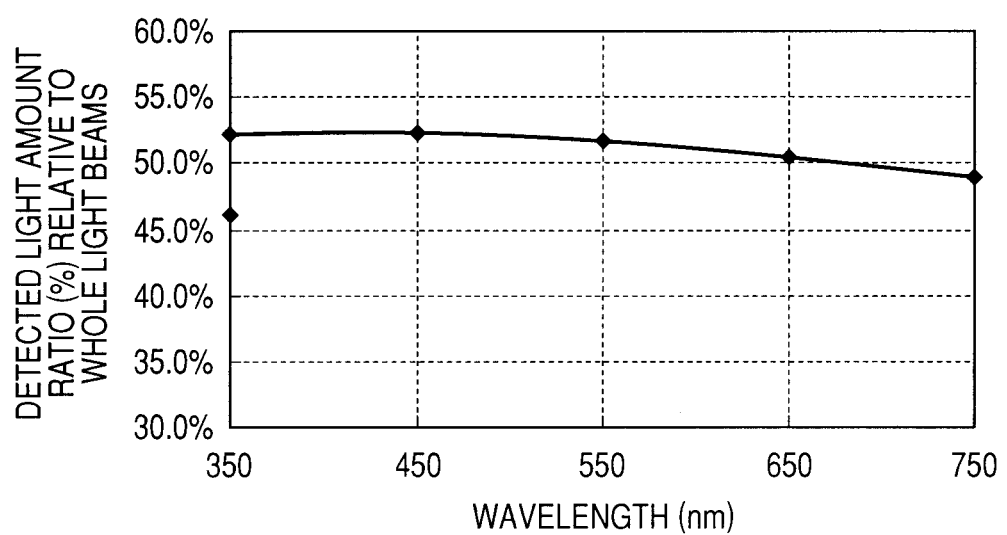
FIG. 11B illustrates a sensor detected light amount ratio relative to whole light beams.

FIG. 11A illustrates a slit image profile in a case where the base surface of the concave reflection type diffraction optical element is formed into a spherical shape (R=r=17.5 mm), as a comparative example. In contrast to this embodiment, as the wavelength becomes longer, blur of the slit image in the non-spectral direction becomes larger. As in FIG. 10B, FIG. 11B is a plot with respect to wavelength, illustrating ratios of the amounts of light beams entering the one-dimensional light receiving element array to the total light amounts of diffraction images at respective wavelengths. Unlike this embodiment, a detected light amount ratio at a wavelength of 350 nm is higher than a detected light amount ratio at a wavelength of 650 nm by 3.2 points. Therefore, when the relationship between the meridional line curvature radius "R" and the sagittal line curvature radius "r" in the diffraction gratings satisfies R≦r, the low diffractive efficiency on the long-wavelength side cannot be compensated by increasing the detectable light amount.

The difference between this embodiment and the comparative example depends on an image plane position in the non-spectral direction. The comparative example illustrated in FIGS. 11A and 11B corresponds to a case where the imaging position (image plane) in the non-spectral direction is the position of a plane 71 illustrated in FIG. 2. That is, the imaging position in the non-spectral direction is outside the Rowland circle. On the other hand, in this embodiment, the imaging position in the non-spectral direction is inside the Rowland circle (position of plane 73). When the imaging position in the non-spectral direction is the position of the plane 71, the total amount of light beams received by the one-dimensional light receiving element array reduces. When the position of the one-dimensional array detector is compared with the imaging position in the non-spectral direction, a distance between the positions on the long-wavelength side is larger than a distance between the positions on the short-wavelength side. As a result, the amount of light on the long-wavelength side is reduced relative to the amount of light on the short-wavelength side. According to the present invention, the diffraction optical element is provided so that the sagittal line curvature radius "r" is smaller than the meridional line curvature radius "R", and hence a received light amount of the one-dimensional light receiving element array on the long-wavelength side may be increased relative to a received light amount thereof on the short-wavelength side to solve the problem described above.

When Expression (3) is not satisfied, the amount of light in the long-wavelength range cannot be ensured, and hence a problem occurs that the detection SN ratio in the long-wavelength range degrades.

In order to increase the detected light amount on the long-wavelength side relative to the detected light amount on the short-wavelength side, the imaging position is set to a position closer to the diffraction optical element with respect to a position of a plane 72 (imaging plane in non-spectral direction, including position on Rowland circle in which image of first-order diffracted light of center wavelength (550 nm) of measured wavelengths is formed) illustrated in FIG. 2, for example, the imaging position is set to a position of a plane 73 in this embodiment. Therefore, the detected light amount on the long-wavelength side may be increased.

That is, it is desirable that the sagittal line curvature radius r satisfy r<r' where r' indicates a sagittal line curvature radius of the concave reflection type diffraction optical element in a case where an imaging plane is formed wherein the imaging plane include imaging positions in the non-spectral direction and includes a position on the Rowland circle at which first-order diffracted light having the following wavelength, $$\lambda = \frac{\lambda_1 + \lambda_2}{2},$$

is imaged.

As is apparent from the above description, when the conditions of Expressions (1), (2), (4), and (5) exceed the upper limit values thereof, the diffractive efficiency of undesirable second-order diffracted light increases, and hence this may become a cause of erroneous detection due to color mixture.

When the conditions of Expressions (1), (2), (4), and (5) exceed the lower limit values thereof, the diffractive efficiency on the short-wavelength side is higher than the diffractive efficiency on the long-wavelength side, and hence the dynamic range may be compensated. However, an absolute value of the diffractive efficiency on the short-wavelength ($\lambda_1$) side significantly reduces, and hence a shortage of an absolute light amount of the entire system occurs.

When the structure in this embodiment is employed as described above, the dynamic range difference between the short-wavelength side and the long-wavelength side in the spectral sensitivity characteristic of the one-dimensional array detector may be compensated by controlling the diffractive efficiency characteristic of the concave reflection type diffraction optical element.

Embodiment 2

Next, a numerical embodiment of a modified embodiment in which the same concave reflection type diffraction optical element 6 as in Embodiment 1 is used is described.

TABLE 3

(Spectrometer Specifications)

| | |
|---|---|
| Spectral range | 400 nm to 700 nm |
| Light source | Ultraviolet LD excitation type white LED |
| Incident slit width | 60 μm |
| Incident slit height | 2 mm |
| Detection element | Si photo diode array |
| Diffraction order m | 1 |
| Pixel pitch of light receiving element | 25 μm |
| Size of light receiving element in non-spectral direction | 1 mm |
| Wavelength resolution | 3.3 nm |

TABLE 4

(Diffraction Optical Element Specifications)

| | |
|---|---|
| Base surface meridional line curvature radius (mm) | 17.5 |
| Base surface sagittal line curvature radius (mm) | 14 |
| Grating pitch P (μm) | 2.52 |
| Grating height h (μm) | 0.200, 0.225 |
| Blaze angle θb (°) | 4.5, 5.1 |
| Incident angle α (°) | 12 |
| Reflective film | Al-based multilayer film |

Figure 9A:
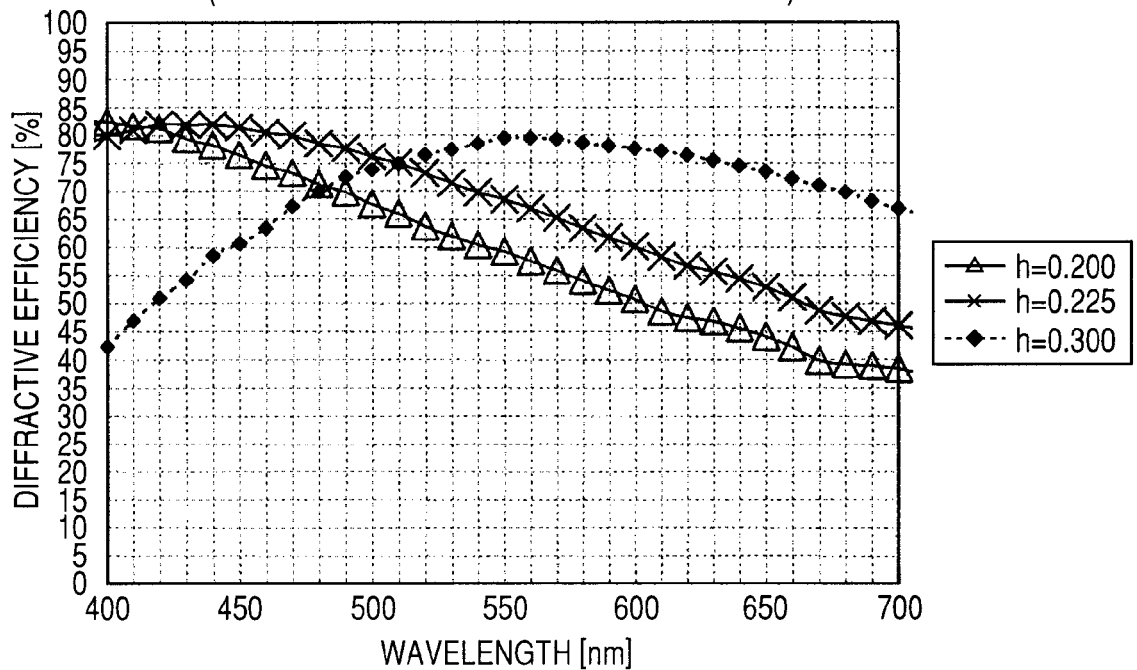
FIG. 9A is an explanatory diagram illustrating a relationship between diffractive efficiency of a diffraction order to be used and a wavelength in a diffraction optical element according to Embodiment 2 of the present invention.

FIG. 9A is a graph illustrating a relationship between the wavelength and the diffractive efficiency $D(\lambda)$ (=(design order light exit amount)/(incident light amount)) of the concave reflection type diffraction optical element according to this embodiment. The reflection characteristic of the reflective film is also taken into account because of the reflection type diffraction optical element, and the diffractive efficiency is calculated by rigorous coupled-wave analysis.

FIG. 9A illustrates diffractive efficiencies of first-order diffracted light which are calculated in three examples, that is, examples of this embodiment in which the grating height "h" is 0.200 μm and 0.225 μm and a comparative example of h=0.300 μm. In this embodiment, $\lambda_1$=400 nm and $\lambda_2$=700 nm.

As is apparent from the comparative example of h=0.300 μm, the diffractive efficiency significantly reduces on the short-wavelength side. In contrast, in the embodiments of h=0.200 μm and 0.225 μm, the diffractive efficiency on the short-wavelength side is larger than the diffractive efficiency on the long-wavelength side. Therefore, an unbalance between the diffractive efficiency on the short-wavelength side and the diffractive efficiency on the long-wavelength side may be corrected based on the spectral sensitivity characteristic of the Si photo diode as illustrated in FIG. 6 and the spectral transmittance of the resin material as illustrated in FIG. 5.

As compared with the embodiments of h=0.200 μm and 0.225 μm, in the comparative example of h=0.175 μm, the diffractive efficiency significantly reduces over the entire range of 400 nm to 700 nm, including $\lambda_1$=400 nm, and hence a shortage of an absolute light amount of the entire system occurs.

In this embodiment, from $\lambda_1=400$ nm, $\lambda_2=700$ nm, and m=1, Expression (4) exhibits "200 nm≦h<245 nm", and hence h=0.200 µm and 0.225 µm satisfy Expression (4). In addition, Expression (1) exhibits "400 nm≦λ<490 nm". As is apparent from FIG. 9A, in the embodiments of h=0.200 µm and 0.225 µm, wavelengths at which the diffractive efficiency D(λ) takes maximum and local maximum values are 400 nm and 430 nm, and hence Expression (1) is satisfied.

In order to compensate the spectral sensitivity characteristic of the Si photo diode which changes smoothly as illustrated in FIG. 6, it is desirable to satisfy Expressions (2) and (5).

From $\lambda_1=400$ nm, $\lambda_2=700$ nm, and m=1, Expression (5) exhibits "200 nm≦h<230 nm", and hence h=0.200 µm and 0.225 µm satisfy Expression (5). In addition, Expression (2) exhibits "200 nm≦λ<460 nm". As is apparent from FIG. 9A, in the embodiments of h=0.200 µm and 0.225 µm, wavelengths at which the diffractive efficiency D(λ) takes maximum and local maximum values are 400 nm and 430 nm, and hence Expression (2) is satisfied.

Figure 9B:
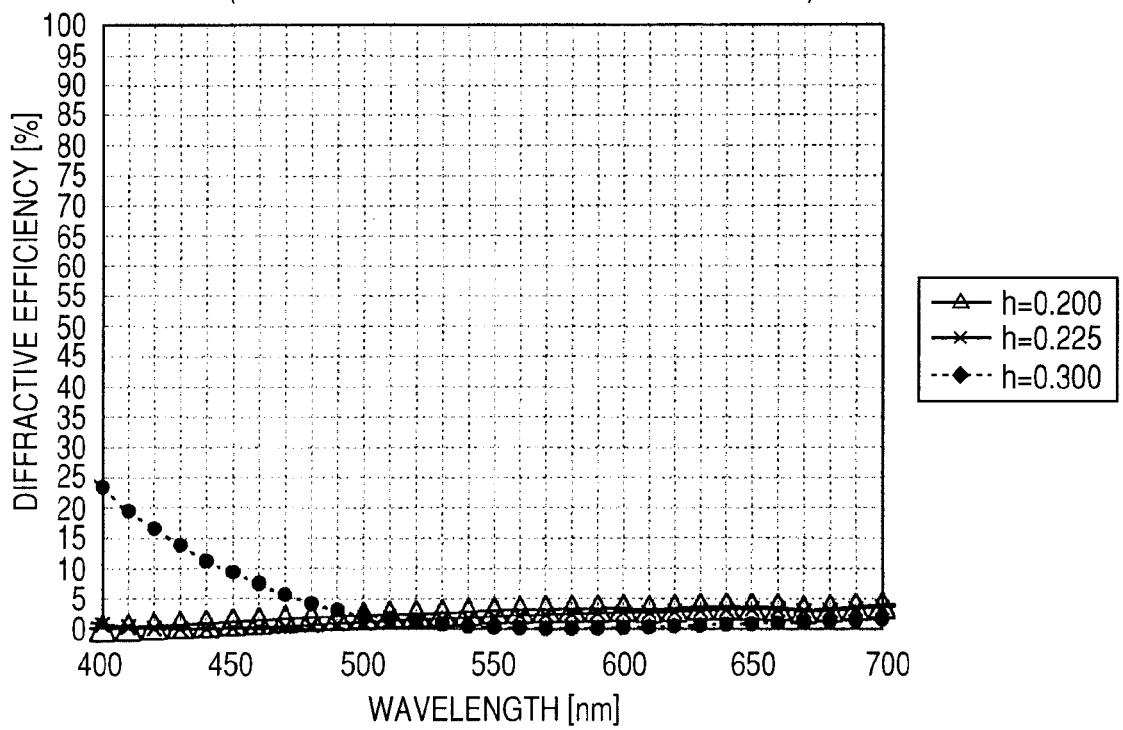
FIG. 9B is an explanatory diagram illustrating a relationship between diffractive efficiency of an adjacent diffraction order and a wavelength in the diffraction optical element according to Embodiment 2 of the present invention.

FIG. 9B illustrates diffractive efficiencies of second-order diffracted light which are calculated in three examples, that is, embodiments in which the grating height "h" is 0.200 µm and 0.225 µm and a comparative example of h=0.300 µm. The second-order diffracted light is undesirable diffracted light and thus becomes a cause of ghosts. For example, second-order diffracted light of light having a wavelength of 400 nm is imaged in the imaging position of first-order diffracted light of light having a wavelength of 800 nm. Therefore, the second-order diffracted light of light having the wavelength of 400 nm is not directly mixed in color with the first-order diffracted light in the range of 400 nm to 700 nm. However, the second-order diffracted light is likely to be reflected on a holding member (not shown) located close to the light receiving element, to become a flare. In such a case, it is necessary to provide a flare blocking member. As compared with the comparative example of h=0.300 µm, in the embodiments of h=0.200 µm and 0.225 µm, the second-order diffracted light on the short-wavelength side is sufficiently reduced. Therefore, a flare does not occur and thus it is unnecessary to provide the flare blocking member.

Even in this embodiment, the sagittal line curvature radius "r" is determined as same as in Embodiment 1. Therefore, the same effect as in Embodiment 1 is obtained although not illustrated.

As is apparent from the above, when the conditions of Expressions (1), (2), (4), and (5) exceed the upper limit values thereof, the diffractive efficiency of undesirable second-order diffracted light increases, and hence this may become a cause of erroneous detection due to flare light.

When the conditions of Expressions (1), (2), (4), and (5) exceed the lower limit values thereof, the diffractive efficiency on the short-wavelength side is higher than the diffractive efficiency on the long-wavelength side, and hence the dynamic range may be compensated. However, an absolute value of the diffractive efficiency in the long-wavelength range, for example, $\lambda_2$ significantly reduces, and hence a shortage of an absolute light amount of the entire system occurs.

When the structure in this embodiment is employed as described above, the dynamic range difference between the short-wavelength side and the long-wavelength side in the spectral sensitivity characteristic of the one-dimensional array detector may be compensated by controlling the diffractive efficiency characteristic of the concave reflection type diffraction optical element.

Embodiment 3
(Image Forming Apparatus)

Figure 12:
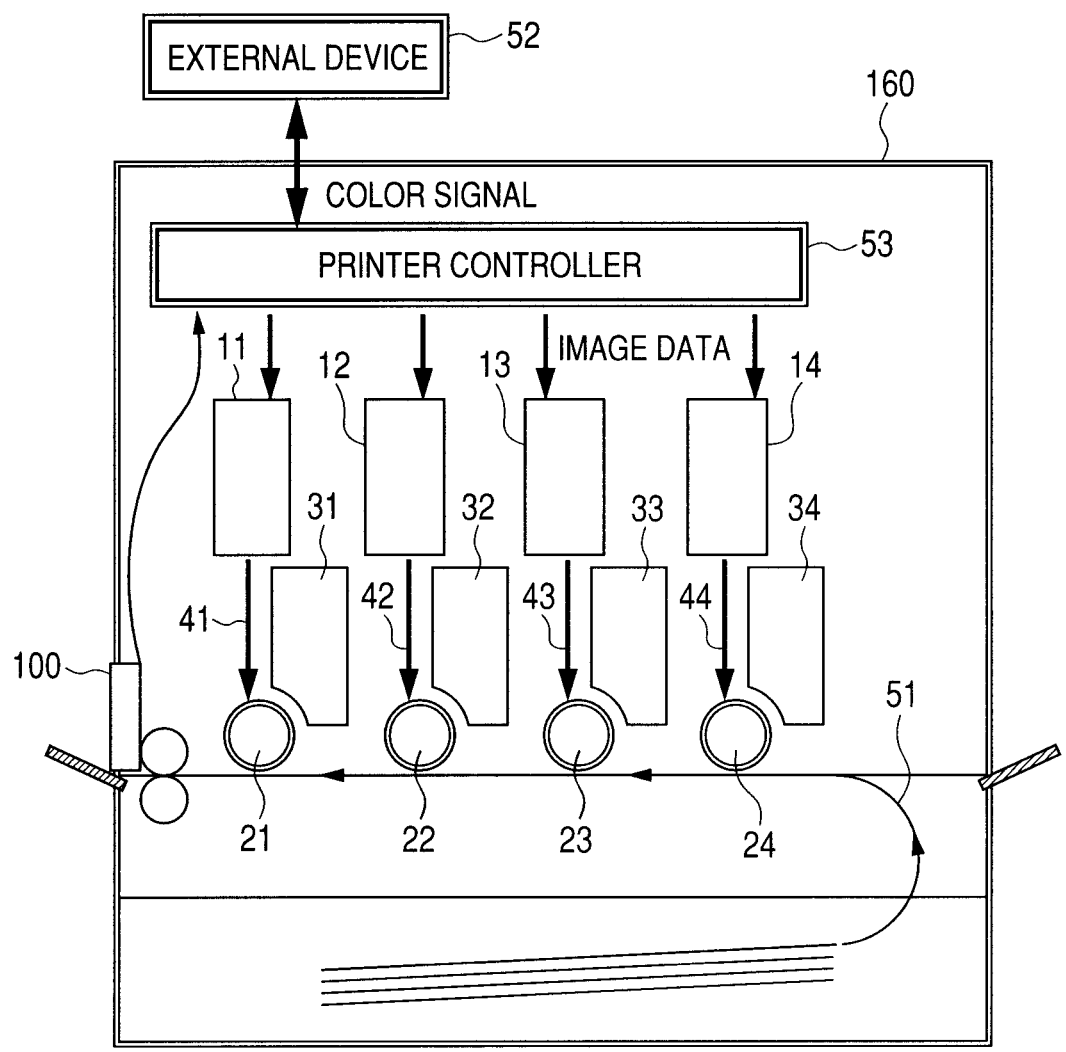
FIG. 12 is a principal cross sectional diagram illustrating a structural example of an image forming apparatus using the spectral color sensor according to the present invention.

FIG. 12 is a principal schematic diagram illustrating a color image forming apparatus according to an embodiment of the present invention. This embodiment illustrates a tandem type color image forming apparatus, in which four optical scanning apparatus are arranged for concurrently recording image information to respective photosensitive drum surfaces each serving as an image bearing member. As illustrated in FIG. 12, a color image forming apparatus 160 includes optical scanning apparatus 11, 12, 13, and 14, photosensitive drums 21, 22, 23, and 24 each serving as the image bearing member, developing assembly 31, 32, 33, and 34, and an intermediate transferring belt 51.

Respective color signals of red (R), green (G), and blue (B) are input from an external device 52, such as a personal computer, to the color image forming apparatus 160. The color signals are converted into respective image data (dot data) of cyan (C), magenta (M), yellow (Y), and black (K) by a printer controller 53 in the color image forming apparatus. The image data are separately input to the respective optical scanning apparatuses 11, 12, 13, and 14. Light beams 41, 42, 43, and 44 modulated based on respective image data are emitted from the optical scanning apparatuses. Photosensitive surfaces of the photosensitive drums 21, 22, 23, and 24 are scanned with the light beams in the main scanning direction.

In the color image forming apparatus according to this embodiment, the four optical scanning apparatus 11, 12, 13, and 14 are arranged so as to correspond to the respective colors of cyan (C), magenta (M), yellow (Y), and black (K), and concurrently record image signals (image information) to the respective surfaces of the photosensitive drums 21, 22, 23, and 24, to thereby print color images rapidly.

In the color image forming apparatus according to this embodiment, as described above, latent images of the respective colors are formed on the corresponding surfaces of the photosensitive drums 21, 22, 23, and 24 using the light beams based on the respective image data from the four optical scanning apparatus 11, 12, 13, and 14. After that, the latent images are developed by the developing assembly and the multi-transfer of the respective colors on the intermediate transferring belt is performed. Then, the image is transferred to a recording material and formed on the recording material by a fixing device.

In the image forming apparatus, a color sensor 100 for chromaticity detection is provided immediately after the fixing device on a conveying path of the recording material and opposed to the image forming surface of the recording material. The color sensor 100 has the structure described in Embodiment 1. The color sensor 100 detects chromaticity of a color patch (chromaticity detection patch) which is formed on and fixed onto the recording material by the image forming apparatus. The chromaticity of the color patch fixed onto the recording material is measured because color matching is then performed in view of a change in chromaticity due to fixing. The result obtained by the detection is transferred to the printer controller, and the printer controller determines whether or not the output color reproduction of the single-color patch is appropriate. When a chromaticity difference between chromaticity of the output single-color patch and chromaticity instructed by the printer controller is within a predetermined range, the color calibration is completed. When the chromaticity difference is outside the predetermined range, the printer controller performs the color calibration which controls the image forming conditions based on the chromaticity information until the chromaticity difference falls within the predetermined range.

As described above, when the color sensor according to the present invention is introduced to an image forming apparatus, a higher degree of calibration may be performed.

The present invention is more suitable for a spectral colorimetric device used for color calibration of a color image forming apparatus. However, the present invention is not limited thereto and is effective to be used for evaluating various spectral characteristics.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-176446, filed on Jul. 29, 2009, which is hereby incorporated by reference herein in its entirety.

What is claimed is:

1. A diffraction optical element used for a Rowland type spectrometer, wherein:
the Rowland type spectrometer detects wavelengths in a range including a wavelength $\lambda_1$ or more and a wavelength $\lambda_2$ or less ($\lambda_1 < \lambda_2$);
the diffraction optical element has a diffractive efficiency which shows a maximum value at a wavelength $\lambda_a$ satisfying, $$\lambda_1 \leq \lambda_a < \frac{7\lambda_1 + 3\lambda_2}{10};$$

the diffraction optical element includes a reference surface having an anamorphic shape; and
the following condition is satisfied:

$$R > r,$$

where R indicates a curvature radius of the reference surface in a circumference direction of a Rowland circle, and r indicates a curvature radius thereof in a direction perpendicular to the Rowland circle.

2. A diffraction optical element according to claim 1, wherein the wavelength $\lambda_a$ satisfies:

$$\lambda_1 \leq \lambda_a < \frac{4\lambda_1 + \lambda_2}{5}.$$

3. A diffraction optical element used for a Rowland type spectrometer, wherein:
the Rowland type spectrometer detects wavelengths in a range including wavelength $\lambda_1$ or more and a wavelength $\lambda_2$ or less ($\lambda_1 < \lambda_2$);
the following condition is satisfied, $$\frac{\lambda_1}{2}m \leq h < \frac{7\lambda_1 + 3\lambda_2}{20}m,$$

where h indicates a grating height of the diffraction optical element, and m indicates a diffraction order to be used;
the diffraction optical element includes a reference surface having an anamorphic shape; and
the following condition is satisfied:

$$R > r,$$

where R indicates a curvature radius of the reference surface in a circumference direction of a Rowland circle, and r indicates a curvature radius thereof in a direction perpendicular to the Rowland circle.

4. A diffraction optical element according to claim 3, wherein the grating height of the diffraction optical element satisfies:

$$\frac{\lambda_1}{2}m \leq h < \frac{4\lambda_1 + \lambda_2}{10}m.$$

5. A diffraction optical element according to claim 1, wherein:
the curvature radius r satisfies, $$r < r',$$

where r' indicates a curvature radius of the reference surface in a direction perpendicular to the Rowland circle in a case where an imaging plane is formed, and
the imaging plane includes imaging positions in the direction perpendicular to the Rowland circle and includes a position on the Rowland circle at which first-order diffracted light having the following wavelength, $$\lambda = \frac{\lambda_1 + \lambda_2}{2},$$

is imaged.

6. A diffraction optical element according to claim 1, wherein the diffraction optical element comprises a blaze diffraction grating.

7. A diffraction optical element according to claim 1, wherein the following condition is satisfied, $\lambda_2 > 2\lambda_1$.

8. A spectral colorimetric apparatus comprising:
an illumination optical system for illuminating a subject to be tested;
a diffraction optical element used for a Rowland type spectrometer for performing spectral separation on a light beam which is reflected on the subject to be tested, wherein:
the Rowland type spectrometer detects wavelengths in a range including a wavelength $\lambda_1$ or more and a wavelength $\lambda_2$ or less ($\lambda_1 < \lambda_2$);
the diffraction optical element has a diffractive efficiency which shows a maximum value at a wavelength $\lambda_a$ satisfying, $$\lambda_1 \leq \lambda_a < \frac{7\lambda_1 + 3\lambda_2}{10};$$

the diffraction optical element includes a reference surface having an anamorphic shape; and
the following condition is satisfied:

$$R > r,$$

where R indicates a curvature radius of the reference surface in a circumference direction of a Rowland circle, and r indicates a curvature radius thereof in a direction perpendicular to the Rowland circle;

a detector that receives a light beam obtained by the spectral separation by the diffraction optical element, and obtains spectral intensity of the light beam; and an analysis unit that computes chromaticity of the subject to be tested based on the spectral intensity.

9. A color image forming apparatus comprising:

a spectral colorimetric apparatus including:

an illumination optical system for illuminating a subject to be tested;

a diffraction optical element used for a Rowland type spectrometer for performing spectral separation on a light beam which is reflected on the subject to be tested, wherein:

the Rowland type spectrometer detects wavelengths in a range including a wavelength $\lambda_1$ or more and a wavelength $\lambda_2$ or less ($\lambda_1 < \lambda_2$);

the diffraction optical element has a diffractive efficiency which shows a maximum value at a wavelength $\lambda_a$ satisfying, $$\lambda_1 \leq \lambda_a < \frac{7\lambda_1 + 3\lambda_2}{10};$$

the diffraction optical element includes a reference surface having an anamorphic shape; and the following condition is satisfied:

R>r, where R indicates a curvature radius of the reference surface in a circumference direction of a Rowland circle, and r indicates a curvature radius thereof in a direction perpendicular to the Rowland circle;

a detector that receives a light beam obtained by the spectral separation by the diffraction optical element, and obtains spectral intensity of the light beam; and an analysis unit that computes chromaticity of the subject to be tested based on the spectral intensity; and a controller that controls an image forming condition based on chromaticity of the subject to be tested.

10. A diffraction optical element used for a Rowland type spectrometer, wherein:

the Rowland type spectrometer detects wavelengths in a range including a wavelength $\lambda 1$ or more and a wavelength $\lambda 2$ or less ($\lambda 1 < \lambda 2$); and the diffraction optical element has a diffractive efficiency which shows a maximum value at a wavelength $\lambda a$ satisfying, $$\lambda_1 \leq \lambda_a < \frac{7\lambda_1 + 3\lambda_2}{10}.$$

11. A diffraction optical element according to claim 10, further including:

an anamorphic surface, and wherein the following condition is satisfied:

R>r, where R indicates a curvature radius of the anamorphic surface in a circumference direction of Rowland circle, and r indicates a curvature radius thereof in a direction perpendicular to the Rowland circle.

* * * * *